May 7, 1968   B. LEE   3,381,846
RADIATOR PRESSURE CAP
Filed Feb. 7, 1966

INVENTOR:
BERT LEE
BY Bedell & Burgess
ATTORNEYS

United States Patent Office 3,381,846
Patented May 7, 1968

3,381,846
RADIATOR PRESSURE CAP
Bert Lee, Mesa, Ariz., assignor to Joe S. Wells,
Colorado Springs, Colo.
Filed Feb. 7, 1966, Ser. No. 525,741
14 Claims. (Cl. 220—44)

ABSTRACT OF THE DISCLOSURE

A radiator pressure cap for use with radiators having different pressure ratings in which the closure disk which engages the annular rim of the radiator inlet aperture is urged downwardly by a spring seated against the cap cover, there being means to selectively vary the spring pressure on the closure disk to provide pressure in accordance with the pressure rating of any radiator to which the cap may be applied. The cap also includes means for selectively varying the position of the closure disk axially with respect to its supporting plunger to adapt the cap to radiators having different filler neck depths.

---

The invention relates to pressure caps for automobile radiators and the like and consists particularly in a radiator pressure cap having selectively variable pressure ratings and usable with radiator filler necks of different depths.

Service stations, automobile supply houses and the like are required to stock a large selection of radiator caps because of the variations in pressure ratings and filler neck depths. For example, common pressure ratings are 4, 7, 12 and 14 to 17 pounds, and filler neck depths are either ¾ inch or one inch.

It is accordingly an object of the invention to provide a radiator pressure cap in which the pressure rating is readily adjustable.

Another object is to provide a radiator cap which can be readily adjusted for use with inlet filler necks of different depths.

A further object is to provide a radiator pressure cap having means for putting water in the radiator without removing the cap.

The foregoing and additional more detailed objectives and advantages of the invention will be evident from the following description and the accompanying drawings in which.

Figure 1:
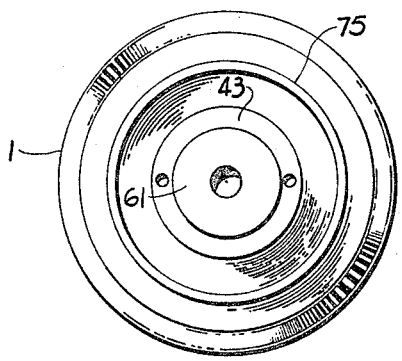
FIG. 1 is a top view of a radiator cap embodying the invention.
Figure 2:
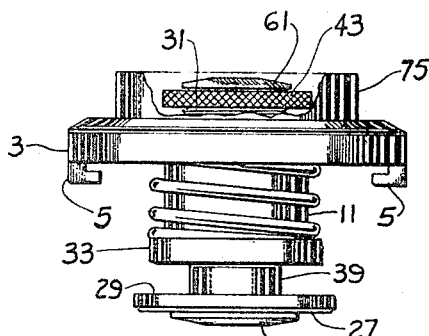
FIG. 2 is a side view of the radiator cap illustrated in FIG. 1, partially broken away.
Figure 3:
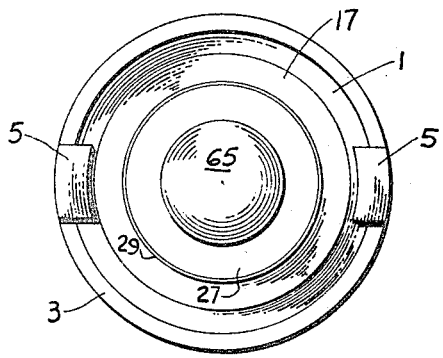
FIG. 3 is a bottom view of the radiator cap illustrated in FIGS. 1 and 2.

The cap comprises a disk-shaped cover 1 having a downturned peripheral flange 3 formed with inturned tabs 5 arranged for locking engagement with flange 7 of radiator filler neck 9. At its center, cover 1 is circularly apertured, and a cylindrical sleeve 11 with an outward peripheral flange 13 on its upper margin is seated on cover 1 by flange 13 and extends downwardly through the cover aperture, its lower margin being inwardly flanged as at 15. For maintaining tabs 5 in engagement with the bottom of filler neck flange 7, a flat disk 17 of resilient material is positioned against the bottom surface of cover 1 and has a downwardly bent peripheral rim engaging the upper surface of the inlet neck rim.

The lower end wall 19 of inlet neck 9 is formed with a central circular aperture 21 communicating with radiator 23, the rim 25 of aperture 21 being slightly elevated to form a seat for rubber gasket 27 on the bottom of closure disk 29, whereby downward pressure on closure disk 29 seals aperture 21.

For providing pressure on closure disk 29, a cylindrical plunger 31 extends through the aperture in cover 1, within sleeve 11, the lower inturned flange 15 of which slidably engages plunger 31 to form a centering guide for the latter. Plunger 31 is outwardly flanged at its lower end, as at 33, and a coil spring 35, seated at its upper end on the bottom of cover 1, and bearing at its lower end against plunger flange 33, to urge the plunger downwardly.

Plunger 31 is formed with a central cylindrical cavity 37, in which is telescopingly received upright cylindrical stem 39 of closured disk 29. For shallow depth filler necks (FIG. 5) the upper surface of closure disk 29 abuts the bottom of plunger 31, so that the pressure of spring 35 forces gasket 27 into sealing engagement with rim 25 of radiator inlet opening 21.

In order to permit use of the cap with radiators having different pressure ratings, a second coil spring 41 is seated on lower flange 15 of sleeve 11 and extends upwardly in the annular space between plunger 31 and sleeve 11. The upper portion of plunger 31 is threaded and a circular nut 43 is threadably mounted on it above, i.e. outwardly of, cover 1 and bears against the upper end of spring 41 so that, by tightening or loosening nut 43, the compression of spring 41 may be increased or decreased respectively. Since spring 41 acts upwardly in opposition to the downward force of spring 35 on plunger 31, tightening nut 43 will decrease the downward pressure on plunger 31 and closure disk 29, and loosening nut 43 will increase the pressure on the closure disk. Thus the pressure can be varied within wide limits to make the cap adaptable for radiators with different pressure ratings.

Figure 6:
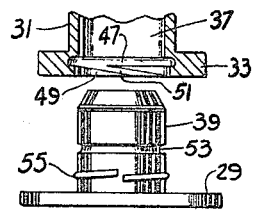
FIG. 6 is a fragmentary, partially vertically sectionalized, view of a portion of the cap, disassembled to show the depth adjustment.
Figure 4:
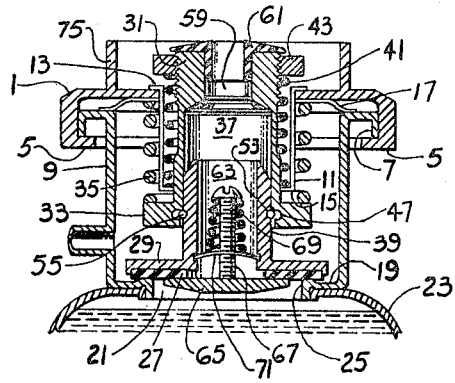
FIG. 4 is a diametral vertical sectional view of the radiator cap.
Figure 5:
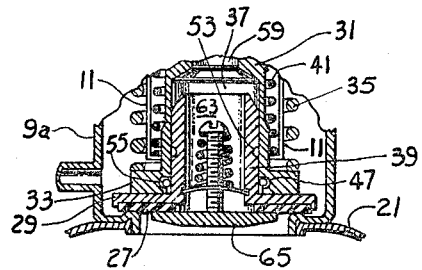
FIG. 5 is a fragmentary view corresponding to FIG. 4 but showing the cap adjusted for application to a shorter filler neck.
Figure 7:
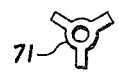
FIG. 7 is a plan view of the check valve spider.

In order to accommodate the cap to radiators with different filler neck depths, means are provided for setting the closure disk a fixed distance below the bottom of plunger 31 (FIG. 4) as well as in abutting engagement with plunger 31 (FIG. 5). As best seen in FIG. 6, a short distance above the bottom of plunger 31, cavity 37 therein is provided with an annular recess 47 and the diameter of the cavity mouth 49 below recess 47 is greater than the diameter of the cavity above the recess, but not as great as the major diameter of the recess. Recess 47 is connected to the bottom of the plunger by a sloping or helical groove 51.

Upstanding stem 39 of closure disk 29 is formed with an annular groove 53 spaced above disk 49 such a distance that when groove 53 and recess 47 in the plunger cavity are horizontally aligned, closure disk 29 will be at the proper depth for the deeper (or one inch) filler necks. A single coil 55 of spring wire, mounted on stem 29 below groove 53 is helically positioned thereon, and the closure disk stem 39 is rotated into plunger cavity 37, coil 55 following helical groove 51 until the coil is seated in annular recess 47. For shallow radiator inlet necks, stem 29 may be slid upwardly in plunger cavity 37 until closure disk 29 abuts the bottom of plunger 31 (FIG. 5). For use with a deeper neck (one inch), stem 29 is retracted from plunger cavity 37 until groove 53 and recess 47 are horizontally aligned, coil 55 having been retained against corresponding downward movement by the lower edge of recess 47, the cavity diameter there-below being less than the aggregate diameter of the stem and coil, when the coil is positioned on the cylindrical surface of the closure stem. When this occurs, coil 55 contracts into groove 53, which is shallower than the wire diameter of coil 55, so that the latter protrudes from the groove, engaging the upper edge of recess 47 and preventing further upward movement of stem 39 in plunger cavity 37 (see FIG. 4). To make possible retraction of stem 39 from cavity 37 after coil 55 has become seated in groove 53 the cavity mouth 49, i.e., that portion of the cavity between recess 47 and the adjacent end of plunger 31 is of slightly greater diameter than the aggregate diameter of the stem and coil when the latter is in the groove.

To provide for filling the radiator without removing the cap and to permit air to enter the radiator when the coolant contracts due to cooling, plunger cavity 37 is connected by a central passageway 59 to the top of the plunger and a grommet 61 of rubber or like material is fitted therein at the top of the plunger to provide a resilient cover on the plunger for sealing engagement with a hose nozzle manually held against it. Closure stem 39 is centrally apertured at 63 to provide a continuous passageway through the plunger and stem and is normally closed at its lower end by disk check valve 65, the stem 67 of which is lightly biased upwardly by coil spring 69 seated on spider 71 mounted in closure stem aperture 63. Spider 71 comprises a washer, through which valve stem 67 passes, with three equiangularly spaced radial projections, of slightly greater radius than aperture 63. The peripheral wall of the latter is formed with an annular groove near its lower end to receive the ends of the projections of spider 71 when the latter is forced upwardly into recess 63. When a hose nozzle is applied to the upper surface of grommet 61 and the water is turned on, the water pressure will unseat valve 65, permitting the admission of water to the radiator. Upon cessation of the flow of water, spring 69 will reseat valve 65 against gasket 27. Similarly, when the coolant in the radiator contracts as it cools, causing a drop in radiator pressure, the pressure differential with respect to atmosphere will unseat valve 65, permitting the admission of air to the radiator, until the pressures become equalized; when this occurs, spring 69 will reseat valve 65 against gasket 27.

For protecting the protruding portion of plunger 31, adjustment nut 43, and grommet 61, against damage, and preventing any additional pressure being applied to grommet 61 or nut 43, which would increase cap pressure, when an automobile hood is lowered, cover 1 is formed with an upstanding guard ring 75.

The invention may be modified in various respects as will occur to those skilled in the art and the exclusive use of all modifications as come within the scope of the appended claims is contemplated.

I claim:

1. A radiator pressure cap comprising a cover arranged for attachment to a radiator outwardly of the radiator inlet aperture, a plunger mounted for movement in a direction normal to said cover and carrying, inwardly of said cover, radiator inlet closure means sealingly engageable with the annular rim of the radiator inlet aperture, spring means seated on said cover and urging said plunger inwardly therefrom to effect such sealing engagement, and means operable outwardly of the cover for selectively varying the pressure exerted by said spring means on said plunger.

2. A radiator pressure cap according to claim 1 in which said pressure varying means comprises second spring means carried by said cover and acting on said plunger in an opposite direction from said first-named spring means, and means for selectively varying the compression of said second spring means.

3. A radiator pressure cap according to claim 2 in which said compression varying means comprises an element threadably mounted on said plunger and forming a seat for said second spring thereon.

4. A radiator pressure cap according to claim 3 in which said threadably mounted element is positioned outwardly of said cover.

5. A radiator pressure cap according to claim 1 including means for presetting said closure means at selected positions spaced apart axially of said plunger to accommodate the cap to different radiator filler neck depths.

6. A radiator pressure cap according to claim 5 in which said plunger contains a cylindrical axial cavity and said closure means has a stem slidably received therein, said closure means being adapted to seat against the end of said plunger remote from said cover in one position and to be spaced from said end of said plunger in another position.

7. A radiator pressure cap according to claim 6 in which the wall of said plunger cavity has an annular recess near its end remote from said cap, a coil of wire positioned in said recess, an annular groove in said closure stem spaced a greater distance from said closure than said recess is from the adjacent end of said plunger, said groove being of less depth than the thickness of said wire, said coil being arranged to contract into said groove when said groove and said recess are in alignment with each other, whereby to prevent further relative axial movement of said closure stem and said plunger so as to fix the position of said closure in spaced relation to the adjacent end of said plunger.

8. A radiator pressure cap according to claim 7 in which the diameter of said cavity between said recess and the adjacent end of the plunger is less than the aggregate diameter of said stem and said coil when said coil is positioned on the outer cylindrical surface of said stem but greater than the aggregate diameter of said stem and said coil when said coil is seated in said stem groove, whereby said stem can then be retracted from said plunger after said groove and recess have become aligned.

9. A radiator pressure cap according to claim 8 in which there is a thread-like helical groove in said cavity wall between said recess and the adjacent end of said plunger whereby said coil may be introduced into said recess, said coil initially being substantially helically positioned on said stem between said groove and said closure.

10. A radiator pressure cap according to claim 6 in which said closure stem has an axial aperture communicating with said plunger cavity and with the opposite side of said closure, there being a normally closed valve controlling said aperture, said valve being operable responsive to fluid pressure in said aperture, and means for introducing fluid under pressure into the end of said plunger outward of said cover.

11. A radiator pressure cap according to claim 10 in which said means for introducing liquid into said plunger comprises an opening in the outer end of said plunger communicating with the cavity therein and a covering of resilient material on the outer end surface of said plunger surrounding said opening.

12. Structure comprising a first element having a cylindrical cavity, a second cylindrical element telescopingly received within said cavity, and means for maintaining said second element at one position axially of said cavity comprising an annular recess in the peripheral wall of said cavity, a coil of wire positioned in said recess, an annular groove in said second element, said groove being of less depth than the thickness of said wire, said coil being arranged to contract into said groove when said groove and recess are in alignment with each other transversely of said elements.

13. Structure according to claim 12 in which the diameter of said cavity between said recess and one end of said element is greater than the aggregate diameter of said second element and said coil when said coil is seated in said groove but less than the aggregate diameter of said second element and said coil when said coil is positioned on the cylindrical surface of said second element whereby said second element can be retracted from said cavity after said groove and recess have been aligned.

14. Structure according to claim 13 in which there is a thread-like helical groove in said cavity wall between said recess and one end of said cavity whereby said coil may be introduced into said recess, said coil initially being substantially helically positioned on the outer surface of said second element posterior to said groove with respect to the direction of insertion of said second element into said cavity.

References Cited

UNITED STATES PATENTS 3,164,288    1/1965    Boomgard _____ 220—44

THERON E. CONDON, *Primary Examiner.*

J. B. MARBERT, *Assistant Examiner.*